(12) United States Patent
Castleman et al.

(10) Patent No.: US 8,387,990 B2
(45) Date of Patent: Mar. 5, 2013

(54) SEAL ASSEMBLY

(75) Inventors: Larry Castleman, Monroeville, IN (US); Mark Sitko, Fort Wayne, IN (US)

(73) Assignee: Trelleborg Sealing Solutions Americas, Fort Wayne, IN (US)

( * ) Notice: Subject to any disclaimer, the term of this patent is extended or adjusted under 35 U.S.C. 154(b) by 343 days.

(21) Appl. No.: 12/556,215

(22) Filed: Sep. 9, 2009

(65) Prior Publication Data

US 2010/0059937 A1  Mar. 11, 2010

Related U.S. Application Data

(60) Provisional application No. 61/095,444, filed on Sep. 9, 2008.

(51) Int. Cl.
*F16J 15/32* (2006.01)

(52) U.S. Cl. .......................... 277/309; 277/551

(58) Field of Classification Search ............... 277/550, 277/551, 572–574, 576–577
See application file for complete search history.

(56) References Cited

U.S. PATENT DOCUMENTS

| | | | |
|---|---|---|---|
| 2,188,857 A | 1/1940 | Chievitz | |
| 3,411,793 A | 11/1968 | Jagger et al. | |
| 3,785,660 A | 1/1974 | Bush | |
| 3,790,180 A | 2/1974 | Heyn et al. | |
| 3,807,743 A | 4/1974 | Burke | |
| 3,868,105 A | 2/1975 | Bentley | |
| 3,965,987 A | 6/1976 | Biffle | |
| 3,984,113 A | 10/1976 | Bentley | |
| 4,084,826 A | 4/1978 | Vossieck et al. | |
| 4,261,583 A * | 4/1981 | de Vries et al. | 277/550 |
| 4,281,724 A | 8/1981 | Garrett | |
| 4,443,017 A | 4/1984 | Knott | |
| 4,480,703 A | 11/1984 | Garrett | |
| 4,484,753 A | 11/1984 | Kalsi | |
| 4,526,243 A | 7/1985 | Young | |
| 4,705,277 A | 11/1987 | Repella | |
| 4,783,084 A | 11/1988 | Biffle | |
| 4,783,086 A | 11/1988 | Bras et al. | |
| 5,358,061 A | 10/1994 | Van Nguyen | |
| 5,711,534 A | 1/1998 | Bengoa et al. | |
| 6,030,124 A | 2/2000 | Moseberg et al. | |
| 6,036,193 A | 3/2000 | Onuma et al. | |
| 6,109,618 A | 8/2000 | Dietle | |
| 6,244,361 B1 | 6/2001 | Comeau et al. | |
| 6,494,462 B2 | 12/2002 | Dietle | |
| 6,511,075 B1 * | 1/2003 | Schmidt | 277/436 |
| 6,572,269 B2 | 6/2003 | Yabe et al. | |
| 6,783,130 B2 * | 8/2004 | Hashida et al. | 277/551 |
| 6,830,641 B2 | 12/2004 | Kosty et al. | |
| 6,837,795 B2 | 1/2005 | Menosky et al. | |
| 7,384,494 B2 | 6/2008 | Kosty et al. | |
| 2002/0153664 A1 * | 10/2002 | Schroeder | 277/551 |

(Continued)

FOREIGN PATENT DOCUMENTS

WO  2006/105129 A2  10/2006

OTHER PUBLICATIONS

Canned scraper shown in document labeled as A was on sale in the United States prior to Sep. 9, 2007 (1 page).

(Continued)

*Primary Examiner* — Vishal Patel
(74) *Attorney, Agent, or Firm* — Taylor IP, P.C.

(57) ABSTRACT

A seal assembly, includes a seal element including at least one seal lip, a wiper element including a wiper lip, and a structural element attached to the seal element and the wiper element, the seal assembly being configured for functioning under pressure in an amount greater than 500 pounds per square inch.

4 Claims, 8 Drawing Sheets

U.S. PATENT DOCUMENTS

2006/0214380 A1 9/2006 Dietle et al.
2007/0187905 A1 8/2007 Berdichevsky

OTHER PUBLICATIONS

Document entitled "Pneumatic Seals", published in Jan. 2009 by Trelleborg (69 pages).

The "Seal-Scraper—Type AWNS" on pp. 36-38 of the attached document entitled "Pneumatic Seals" (Cite No. 2 in the Non-Patent Literature Documents of this Information Disclosure Document) was sold in the United States before Sep. 9, 2007 and has a limit below 500 psi.

The "Piston Seal—Type ARS" on pp. 34-35 of the attached document entitled "Pneumatic Seals" (Cite No. 2 in the Non-Patent Literature Documents of this Information Disclosure Document) was on sale in the United States before Sep. 9, 2007 and has a limit below 500 psi.

* cited by examiner

SEAL ASSEMBLY

CROSS REFERENCE TO RELATED APPLICATIONS

This is a non-provisional application based upon U.S. provisional patent application Ser. No. 61/095,444, entitled "SEAL ASSEMBLY", filed Sep. 9, 2008, which is incorporated herein by reference.

BACKGROUND OF THE INVENTION

1. Field of the Invention

The present invention relates to seal assemblies, and, more particularly, to high pressure seal assemblies.

2. Description of the Related Art

Seals in the form of seal rings often provide sealing function in linear or rotational applications. In linear applications, the seal can be seated in a housing groove and seal against a reciprocating rod which is moving back-and-forth in a linear manner. In rotational applications, the seal can be seated in a housing groove and seal against a rotating rod. In either case, system pressure can be applied, for example, to one side of the seal. If the seal is not properly designed to handle a certain amount of upstream pressure, the seal can extrude through a housing gap formed between the housing and the rod, the seal extruding to the downstream side of the housing groove.

Figure 22:
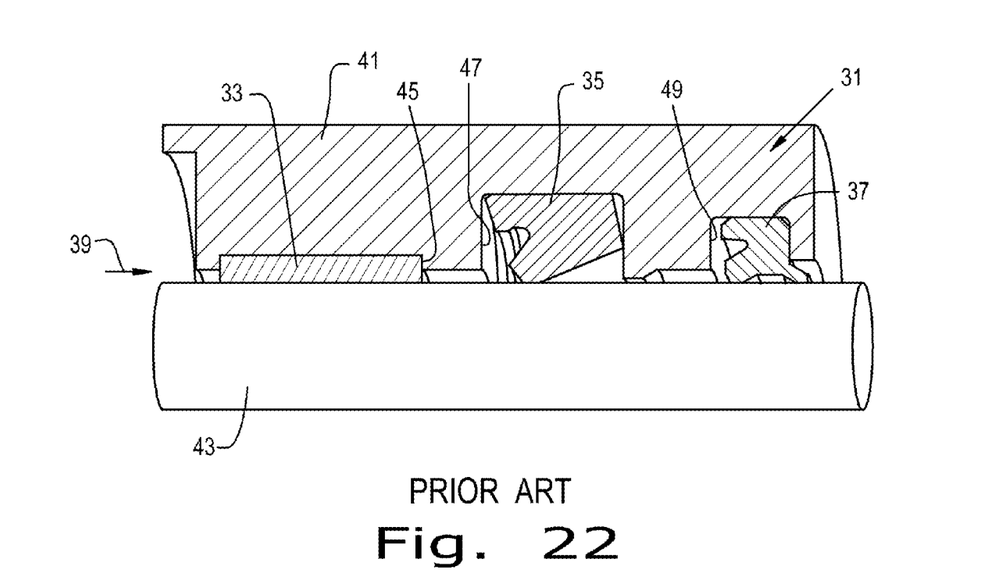
FIG. 22 is a partially sectioned perspective view of a prior art seal system.

A seal system 31 is known which is shown in FIG. 22. Seal system 31 includes a bearing 33, a primary seal 35, and a combination seal and wiper/scraper 37. System pressure is applied as shown by arrow 39. The hardware includes a housing 41 and a reciprocating rod 43. The bearing 33 is seated within a first housing groove 45. The primary seal 35 is seated within a second housing groove 47, and the combination seal and wiper/scraper 37 is seated within a third housing groove 49. A disadvantage of seal system 31 is that it includes a number of components 33, 35, 37 which are separate from one another and requires three housing grooves 45, 47, 49.

Press fit scrapers are known which can be retained in hardware by a snap-ring or a bolted end cap. The snap-ring and bolted endcap have the disadvantage of being additional components relative to the scraper.

What is needed in the art is a seal assembly which has a reduced number of parts and can withstand pressure in an amount greater than 500 pounds per square inch (psi).

SUMMARY OF THE INVENTION

The present invention provides a seal assembly which has a reduced number of parts and can withstand pressure up to 3,000 psi.

The invention in one form is directed to a seal assembly, including a seal element including at least one seal lip, a wiper element including a wiper lip, and a structural element attached to the seal element and the wiper element, the seal assembly being configured for functioning under pressure in an amount greater than 500 pounds per square inch.

The invention in another form is directed to a method of sealing using a seal assembly, the method including the steps of: providing the seal assembly which includes a seal element including at least one seal lip, a wiper element including a wiper lip, and a structural element attached to the seal element and the wiper element; installing the seal assembly in a housing groove; and applying pressure to the seal assembly in an amount greater than 500 pounds per square inch, the seal assembly functioning under the pressure.

An advantage of the present invention is that it provides a seal assembly which is a combination seal and wiper.

Another advantage of the present invention is that it combines two or more products to form the seal assembly. That is, the seal assembly can include: a) a seal and a wiper; b) a seal and a wiper, as well as a retention device; c) a seal and a wiper, as well as a bearing; and d) a seal and a wiper, as well as a retention device and a bearing. Each of the variations includes either a central structural element or at least one can (the central structural element and the at least one can being referred to generally as a structural element).

Another advantage of the present invention is that it provides, to an end-user, a smaller space, less weight, lower cost hardware, a reduction in the number of parts, easier assembly, less installation time, a lower cost seal, damage tolerance, less system cost, and more bearing space.

Yet another advantage of the present invention is that the seal assembly, which is a combination seal and wiper, can be used in an environment up to 3,000 psi, the seal assembly being either a unitized seal assembly or a one-piece seal assembly. The seal assembly of the present invention thus includes a seal and a wiper (which is thus a combination seal and wiper), the seal assembly functioning in a high-pressure environment up to 3,000 psi. The seal assembly thus provides sealing function and wiper function in one product. The seal assembly further includes an additional element (the structural element), shown in the attached figures as at least one can or a central structural element.

Yet another advantage of the present invention is that the seal assembly includes a seal element and a wiper with a metal case that can be installed and retained without damage up to about 3,000 psi (or, stated another way, up to about 200 bar).

Yet another advantage of the present invention is that it provides, in an embodiment of the present invention, a retention feature which retains the seal assembly in the housing groove, the retention device being either in addition to the seal assembly (including the seal, the wiper, and the structural element (that is, the can or the central structural element)) or as a part of the seal assembly (a self-retention feature). Stated another way, a self-retaining feature can lock a seal/wiper combination or a seal/wiper/bearing combination into the hardware without the cylinder manufacturer requiring a snap-ring, an endcap, or another component to retain the seal/wiper combination or the seal/wiper/bearing combination in the hardware.

Yet another advantage of the present invention is that the can(s) and the central structural element can provide, or be provided with, a retaining feature and can provide resistance to pressure.

Yet another advantage of the present invention is that combining the seal and wiper in one assembly eliminates the groove between the seal and wiper for weight and space savings.

Yet another advantage of the present invention is that combining the seal and wiper with a static outside diameter seal provides an outside diameter seal.

Yet another advantage of the present invention is that combining the seal and wiper eliminates a rod housing that has a bearing groove, a seal groove, and a wiper groove in it.

Yet another advantage of the present invention is that combining the seal and wiper provides a seal assembly that can slide directly into a bore of a housing.

Yet another advantage of the present invention is that it can be applied primarily to linear applications (i.e., a reciprocating rod within a housing) but can also be applied to rotation applications (i.e., a rotating rod within a housing) as well.

Yet another advantage of the present invention is that it the combination seal/wiper assembly can also include a bearing (such as a polymer or metal bearing). The bearing can be positioned between the seal and the wiper to provide a rod guiding feature.

Yet another advantage of the present invention is that it provides a combination of two or more products—the products being a seal, a wiper, a bearing, a retention device.

Yet another advantage of the present invention is that it provides a seal assembly (a) with a structural element (i.e., a can, or a central structural element, as discussed below) which can withstand high pressure, (b) which provides good scraping, (c) with a static outside diameter seal (i.e., a seal against the housing groove), (d) which can hold a bearing in place, and (e) which can still provide good sealing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
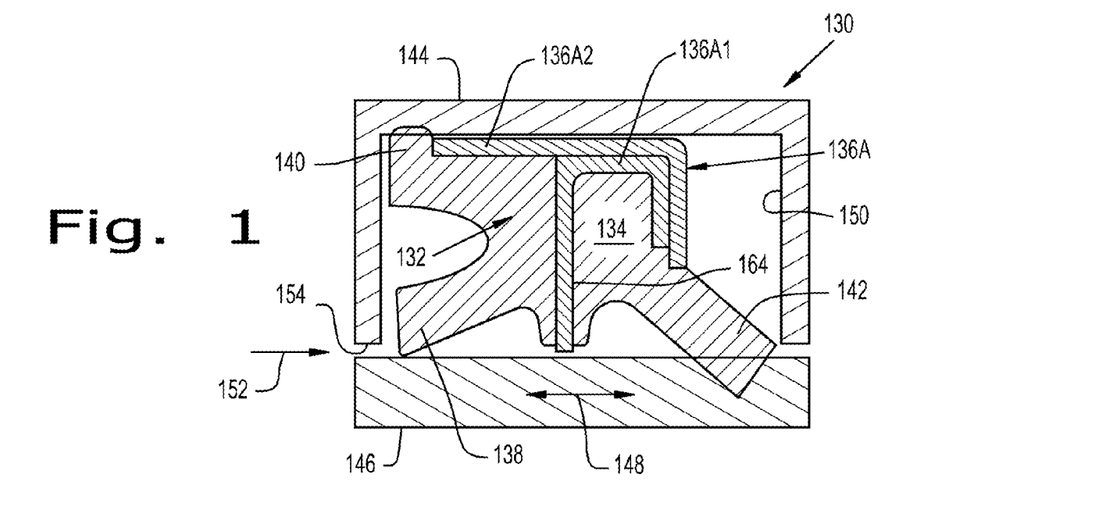
FIG. 1 is a schematic representation of a sectional view of a seal assembly according to the present invention.

Referring now to the drawings, and more particularly to FIG. 1, there is shown a seal assembly 130 which generally includes a seal element 132, a wiper element 134, and a structural element 136A attached to seal element 132 and wiper element 134 and thereby providing a combination seal and wiper 130. Seal element 132 includes at least one seal lip 138; more specifically, FIG. 1 shows that seal element 132 includes an inside diameter seal lip 138 and an outside diameter seal lip 140. Wiper element 134 includes a wiper lip 142. Seal assembly 130 is configured for functioning under pressure 152 in an amount greater than 500 pounds per square inch (psi). Seal assembly 130 can function under pressure 152 in an amount up to 3,000 psi.

The present invention, as indicated above, can be used in reciprocating, linear applications, but is not necessarily limited to these applications (it could be used in rotational applications as well). The seal assembly of the present invention can be used as a rod-type seal (static outside diameter seal lip sealing against housing groove, dynamic inside diameter seal lip sealing against rod, and dynamic wiper lip against rod) or a piston-type seal (static inside diameter seal lip sealing against groove of piston, dynamic outside diameter seal lip sealing against cylinder, and dynamic wiper lip against cylinder). As a rod-type seal, the seal assembly is installed in a groove formed in a housing of the system including the housing, the rod, and the seal assembly, with the open portion of the housing groove facing radially inwardly toward the rod. As a piston-type seal, the seal assembly is installed in a housing groove formed in the piston of a system including the piston, a cylinder, and the seal assembly, with the open portion of the housing groove facing radially outwardly toward the cylinder. For ease of discussion and unless otherwise noted below, the seal assemblies discussed herein are used as a rod-type seals.

Seal assembly 130 is disposed in system hardware, which can include for example a housing 144 (such as a cylinder) and a reciprocating rod 146, rod 146 providing linear movement and thus reciprocating left and right on the page of FIG.

1 (as shown by arrow 148). It is understood that the housing 144 and rod 146 shown in the drawings are only partially shown. Housing 144 defines a housing groove 150 in which seal assembly 130 is disposed. Inside diameter seal lip 138 seals against rod 146 and is thus a dynamic seal. Outside diameter seal lip 140 seals against a surface of housing groove 150 (namely, the horizontal wall of housing groove 150, as shown in FIG. 1) and is thus a static seal. The pressure on the seal assembly 130 is provided by the overall system in which seal assembly 132 is disposed. This system includes the housing 144, rod 146, and a fluid which is sealed off from the outside of the hardware (the hardware including the housing 144 and rod 146) in which seal assembly 130 is disposed. In FIG. 1, as in the other figures showing a housing and a rod, system pressure 152 comes from the left of the seal assembly 130, as shown by arrow 152 in FIG. 1. The fluid under pressure can flow in a housing gap 154 defined by housing 144 and rod 146. Seal assembly 130 prevents pressurized fluid (or at least all but a predetermined amount of such fluid) from escaping to the other side (the downstream side) of seal assembly (the right of seal assembly 130). Thus, the upstream side of seal assembly 130 is to the left of the page in FIG. 1 and the downstream side of seal assembly 130 is to the right of the page in FIG. 1 (as well as in the remaining figures). The fluid can be a lubricant, such as oil (this example of the fluid is provided by way of example and not by way of limitation). The seal assemblies shown in the drawings are essentially seal rings; only the top portions of the seal rings are shown, for the sake of clarity.

Seal 132 of seal assembly 130 serves to do the majority of the sealing. The sealing serves to maintain cleanliness of the fluid associated with, for example, the overall system including the housing 144 and the rod 146. Rod 146, however, can pick up contaminants, such as debris, wood chips, etc. The wiper lip 142 of wiper 134 serves to keep out such contaminants. The seal element 132 can leave a fluid film on the rod. Wiper 134 thus also performs some sealing and further ensures that the fluid film (such as an oil film) is the right thickness. Seal element 132 can be made of, for example, polyurethane.

FIG. 1 shows that seal assembly 130 includes structural element 136A formed as a can assembly 136A including inner metal can 136A1 and an outer metal can 136A2. The cans 136A1, 136A2 lower the gap where seal material can flow or extrude under pressure and temperature. For instance, inner can 136A1 extends downward to such an extent that would serve to effectively prevent seal element 132 from extruding and thereby flowing under inner can 136A1 and thus toward the wiper 134. Each of the cans in the drawings has such a downward extent to prevent such extrusion of the seal element. Further, can assembly 136A of FIG. 1 can be used in holding seal assembly 130 to an adjacent structure, such as housing 144, when seal assembly 130 is a rod-type seal; for instance, a snap-ring (not shown in FIG. 1) can be used to hold the structural element (i.e., the can assembly 136A in FIG. 1) in groove 150 (housing groove 150 of FIG. 1 could be modified to include a recess in which the snap-ring seats). As indicated, seal element 132 can be made of a polymer, such as polyurethane. Further, wiper 134 can be made of a metal or a polymer, such as polyurethane. The materials of seal element 132 and wiper element 134 are provided by way of example and not by way of limitation.

The structural element of the present invention is at least one can or a central structural element. Thus, the drawings show the structural element of the present invention as either a can (i.e., 136A in FIG. 1) or a central structural element (i.e., 436B in FIG. 4). Thus, "A" with 136 or a multiple of 100 thereof refers to the structural element formed as a can (or a can assembly including a plurality of cans). The can of the present invention can be a single can or a can assembly including a plurality of cans. Further, "B" with 136 or a multiple of 100 thereof refers to the structural element formed as a central structural element (the drawings do not contain a "136B" reference character; this reference character is discussed by way of explanation only). FIGS. 1-3 and 6-18 show that the structural element is formed as at least one can. FIGS. 4-5 and 19-21 show that the structural element is formed as a central structural element (not a can). The structural element (that is, the can(s) or the central structural element) can be made of metal (such as steel) or can be made of a polymer, such as a high-strength polymer (such as nylon). These materials are provided by way of example and not by way of limitation. The structural element (regardless of whether the structural element is formed as a can(s) or a central structural element) serves: (1) to provide a structure to which a seal and a wiper are attached; (2) to provide structural rigidity to the seal assembly to allow the seal assembly to withstand pressures up to 3,000 psi (the structural element thus provides resistance to system pressure); (3) to prevent extrusion of seal element through the housing gap by, at least in part, lowering the gap under which seal material can flow under pressure and temperature; (4) to provide a quick and easy method for retaining the seal assembly in the housing groove (i.e., by attaching an additional retaining element to the structural element or by forming the structural element to include a retaining element); (5) to provide a structure to which a bearing element can be attached or, optionally, to provide a structure which integrally forms and thus includes the bearing; (6) to facilitate easier insertion of the seal assembly into the housing groove; (7) to provide a position on the seal assembly on which an installer can exert force (i.e., by pushing, pressing, hammering, or pounding in an appropriate manner) to insert the seal assembly into housing groove and/or to move the seal assembly left or right within housing groove; and (8) to provide enough support to the seal assembly to prevent the seal assembly from deforming, deflecting, or distorting (i.e., turning sideways) during installation and/or when encountering system pressure during use.

Figure 4:
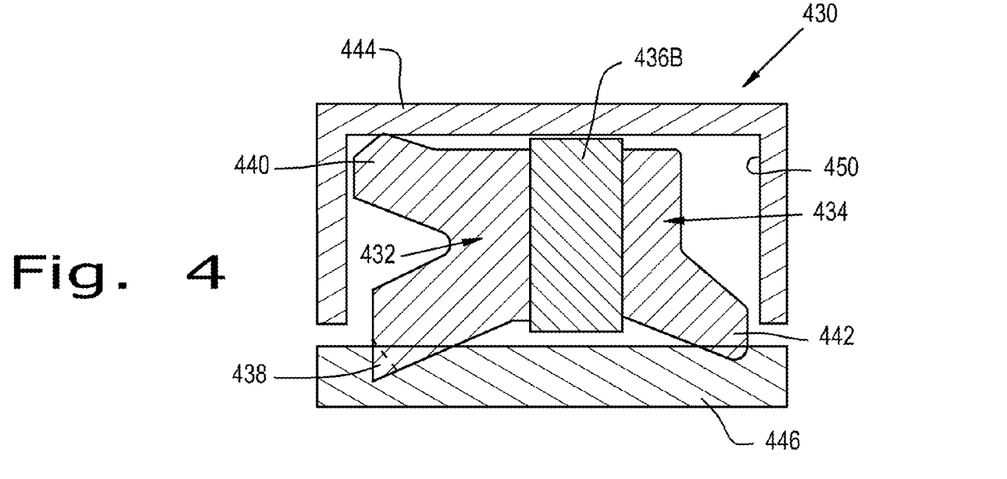
FIG. 4 is a schematic representation of a sectional view of a seal assembly according to another embodiment of the present invention.
Figure 21:
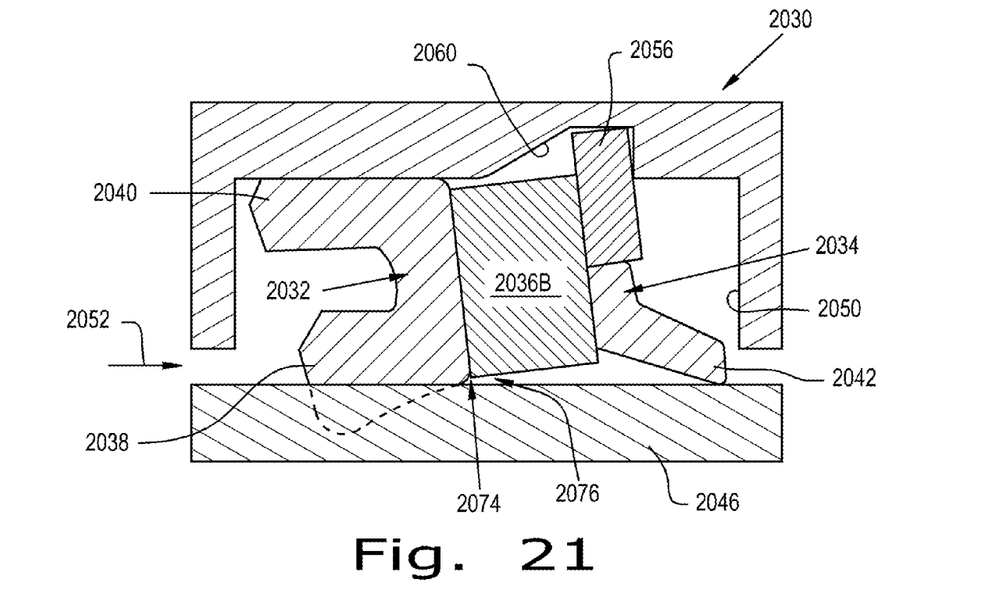
FIG. 21 is a schematic representation of a sectional view of the seal assembly of FIG. 20, the seal assembly being shown after application of system pressure.

Seal assembly 130 can function under pressure 152 in an amount up to 3,000 psi. One critical factor which allows seal assembly 130 to function under such high pressure (up to 3,000 psi) is that the material forming seal element 132 does not extend below the downward extending, centrally located leg 164 of can 136A on its way to connecting with wiper element 134. Stated another way, leg 164 extends below seal element 132 at the point that seal element 132 connects with leg 164. Stated yet another way, leg 164 of can 136A includes an inside diameter (the bottom edge of leg 164 in the page of FIG. 1) which extends radially inwardly relative to seal element 132 (since seal assembly 130 is actually formed substantially as a ring around rod 146, then the direction "radially inwardly" points down toward rod 146 and the direction "radially outwardly" extends up and away from rod 146, in the page of FIG. 1). Such a downward extent of leg 164 relative to seal element 132 prevents seal element 132 from extruding below and to the downward side of leg 164 (to the right on the page of FIG. 1) under pressure 152. Further, pressure 152 typically causes seal assembly 130 to rotate (counter-clockwise on the page of FIG. 1). This rotation is not shown in FIG. 1 but is shown in FIG. 21. Such rotation further inhibits seal element 132 from extruding under leg 164 under pressure 152. Each of the embodiments shown in the drawings has a downwardly extending, centrally located leg (if the structural element is a can). While each such leg is not labeled in the drawings, it is understood that each such leg functions similar to leg 164. Similarly, the central structural element shown in the drawings (in place of the can) also has a similar downward extent relative to the corresponding seal element; that is, the central structural element, i.e., element 436B, extends below the corresponding seal element, i.e., 432, to prevent extrusion of the corresponding seal element to the downward side of the central structural element under system pressure.

Further, the length and angle of wiper lip 142 has been formed such that the wiper continues to wipe off contaminants while not wiping too much of the fluid film off rod 146 under system pressure 152 (the fluid film is desirable to prevent friction between seal lip 138 and rod 146 from damaging seal lip 138); that is, as seal assembly 130 rotates counterclockwise (as discussed above) wiper lip 142 must still perform its wiping function (the length and angle of wiper lip 142 is such that wiper lip 142 continues to function properly even under rotation under high pressure from pressure 152). Accordingly, wiper element 134 has been optimized to function under high pressure (i.e., up to 3,000 psi) upon rotation of seal assembly 130. This feature of the wiper element of the present invention is present in each of the embodiments of the present invention.

Figure 2:
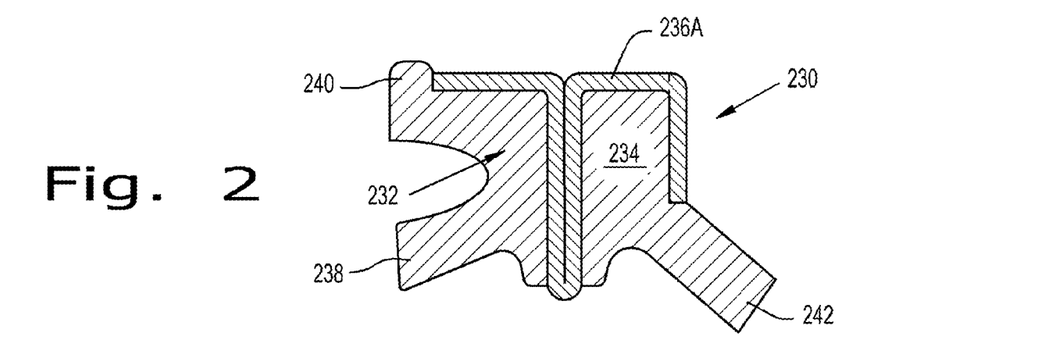
FIG. 2 is a schematic representation of a sectional view of a seal assembly according to another embodiment of the present invention.

FIG. 2 shows another embodiment of the seal assembly according to the present invention. Structural features in FIG. 2 corresponding to similar features in FIG. 1 have reference characters raised by a multiple of 100. FIG. 2 does not show the housing, the housing groove, or the rod, for the sake of clarity; however, it is understood that seal assembly 230 of FIG. 2 seats in a housing groove and is associated with a housing and a rod as in FIG. 1. Seal assembly 230 includes seal element 232, wiper element 234, and structural element 236A. Seal element 232 includes inside diameter seal lip 238 sealing dynamically against the rod and outside diameter seal lip 240 sealing statically against a surface of the housing groove. Wiper element 234 includes a wiper lip 242 which is positioned against the rod. The structural element 236A is formed as a single can to which seal element 232 and wiper element 234 are attached. Can 236A includes a downwardly extending, centrally located leg, as well as generally horizontal legs extending opposite one another at the upward extent of the downwardly extending leg. This leg helps prevent extrusion of seal element 232 to the downstream side of leg. Can 236A also includes an optional downstream leg; the optional nature of this downstream leg is signified by the vertical broken line.

Figure 3:
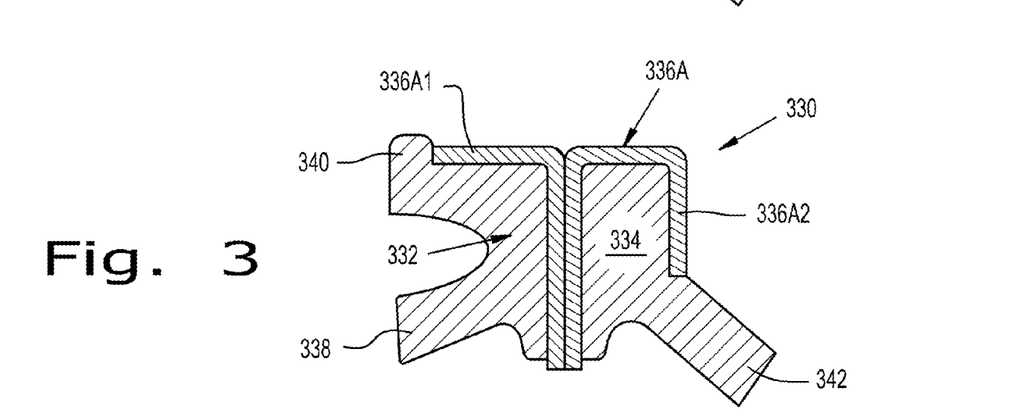
FIG. 3 is a schematic representation of a sectional view of a seal assembly according to another embodiment of the present invention.

FIG. 3 shows another embodiment of the seal assembly according to the present invention. Structural features in FIG. 3 corresponding to similar features in prior figures have reference characters raised by a multiple of 100. FIG. 3 does not show the housing, housing groove, or the rod, for the sake of clarity; however, it is understood that seal assembly 330 of FIG. 3 seats in a housing groove and is associated with a housing and a rod as in FIG. 1. Seal assembly 330 includes seal element 332, wiper element 334, and structural element 336A. Seal element 332 includes inside diameter seal lip 338 sealing dynamically against the rod and outside diameter seal lip 340 sealing statically against a surface of the housing groove. Wiper element 334 includes a wiper lip 342 which is positioned against the rod. Structural element 336A is formed as a can assembly to which seal element 332 and wiper element 334 are attached. Can assembly 336A includes an upstream can 336A1 and a downstream can 336A2. Each of the upstream and downstream cans 336A1, 336A2 includes a downwardly extending, centrally located leg; these legs can be bonded (i.e., chemically and/or mechanically) to one another.

FIG. 4 shows another embodiment of the seal assembly according to the present invention. Structural features in FIG. 4 corresponding to similar features in prior figures have reference characters raised by a multiple of 100. Seal assembly 430 includes seal element 432, wiper element 434, and structural element 436B. Seal assembly 430 is seated in groove 450 of housing 444 and seals on the inner diameter of seal assembly 430 against rod 446. Seal element 432 includes inside diameter seal lip 438 sealing dynamically against rod and outside diameter seal lip 440 sealing statically against a surface of housing groove. Wiper element 434 includes a wiper lip 442 which is positioned against rod 446. Structural element 436B is formed as a central structural element (which can be formed as a single, monolithic piece) to which seal element 432 and wiper element 434 are attached, central structural element 436B being located between seal 432 and wiper 434. The seal 432 and the wiper 434 can be bonded to the structural element 436B. Grooves can be formed on the faces of the structural element 436B to increase the adhesion between polyurethane (i.e., forming seal element 432 and/or wiper element 434) and the structural element 436B. The structural element 436B serves, among other things (as discussed above) to prevent the seal material of the seal 432 from extruding thereunder to the downstream side of seal assembly 430. The structural element 436B can be made of, for example, metal or plastic. The structural element 436B can be a metal ring (made of bronze or possibly brass) positioned in the middle of the three lips (the wiper lip 442 and the two seal lips 438, 440). Such a structural element 436B may be less expensive than two steel rings in the form of cans (steel rings can be used to form any of the cans of the present invention). The structural element 436B of FIG. 4 can also avoid damage during possible contact with the rod 446. The dimensions of the structural element 436B could be modified so as to provide a bearing. Structural element 436B is made of a material which is different from a material of seal element 432 and a material of wiper element 434. Structural element 436B includes a downstream side and an inner diameter surface which the downstream side does not include, wiper element 434 being bonded to only the downstream side of structural element 436B, wiper element 434 not being attached to the inner diameter surface of structural element 436B, the downstream side of structural element 436B including a downstream-most surface to which wiper element 434 is bonded, the downstream-most surface being a radial surface, structural element 436B including an upstream-most radial surface which opposes the downstream-most radial surface, seal element 432 being bonded to the upstream-most radial surface, the inner diameter surface and the downstream-most surface respectively each being straight in a radial cross-section through structural element 436B.

Figure 5:
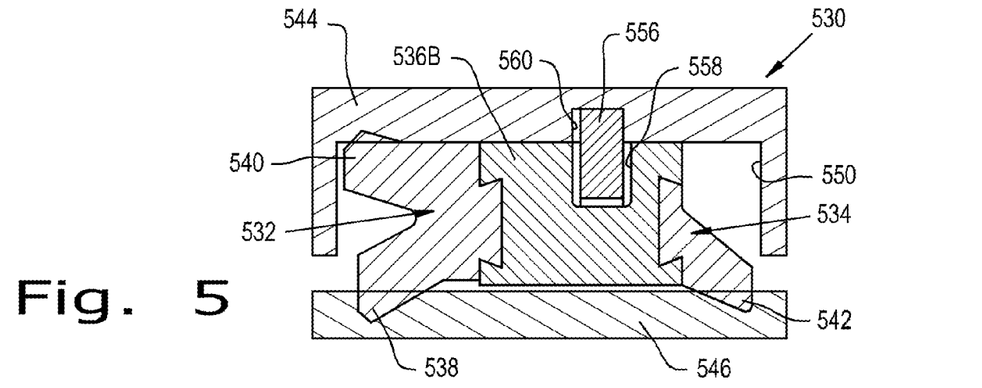
FIG. 5 is a schematic representation of a sectional view of a seal assembly according to another embodiment of the present invention.

FIG. 5 shows another embodiment of the seal assembly according to the present invention. Structural features in FIG. 5 corresponding to similar features in prior figures have reference characters raised by a multiple of 100. Seal assembly 530 includes seal element 532, wiper element 534, and structural element 536B. Seal assembly 530 is seated in groove 550 of housing 544 and seals on the inner diameter of seal assembly 530 against rod 546. Seal element 532 includes inside diameter seal lip 538 sealing dynamically against rod 546 and outside diameter seal lip 540 sealing statically against a surface of housing groove 550. Wiper element 534 includes a wiper lip 542 which is positioned against rod 546. Structural element 536B is formed as a central structural element (which can be formed as a single, monolithic piece) to which seal element 532 and wiper element 534 are attached. Central structural element 536B includes opposing female dovetail recesses in which the corresponding male dovetail projections of seal element 532 and wiper element 534 matingly fits. Such a connection between seal element 532 and central structural element 536B and between wiper element 534 and central structural element 536B can be enhanced in other ways as well (i.e., adhesive, bonding). FIG. 5 shows that seal assembly 530 further includes a retention element 556, which is coupled with central structural element 536B and is configured for retaining seal assembly 530 in housing groove 550. Retention element 556 can be formed as a snap-ring which snaps into a groove 558 about central structural element 536B and also fits within a recess 560 formed by housing groove 550. Such a snap-ring 556 is not formed integral with central structural element 536B but is a separate piece that is added to the seal assembly 530 during installation of seal assembly 530 in housing groove 550. As such, in FIG. 5, central structural element 536B does not include snap-ring 556.

Figure 6:
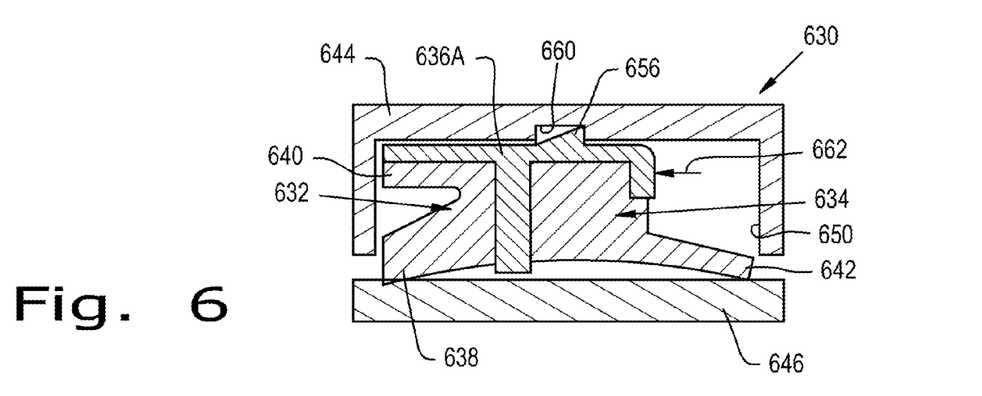
FIG. 6 is a schematic representation of a sectional view of a seal assembly according to another embodiment of the present invention.

FIG. 6 shows another embodiment of the seal assembly according to the present invention. Structural features in FIG. 6 corresponding to similar features in prior figures have reference characters raised by a multiple of 100. Seal assembly 630 includes seal element 632, wiper element 634, and structural element 636A. Seal assembly 630 is seated in groove 650 of housing 644 and seals on the inner diameter of seal assembly 630 against rod 646. Seal element 632 includes inside diameter seal lip 638 sealing dynamically against rod 646 and outside diameter seal lip 640 sealing statically against a surface of housing groove 650. Wiper element 634 includes a wiper lip 642 which is positioned against rod 646. Structural element 636A is formed as a single can to which seal element 632 and wiper element 634 are attached. Can 636A includes a downwardly extending, centrally located leg which helps prevent extrusion of seal element 632 to the downstream side of this leg. Can 636A further includes a retention element 656 which can be formed integral with can 636A or can be otherwise affixed to can 636A. Retention element 656 in FIG. 6 is shown as a wedge which fits within a recess 660 formed by housing groove 650. Arrow 662 pointing toward the downwardly extending, downstream leg of can 636A represents installation pressure exerted by an installer to move seal assembly 630 from right to left during installation; stated another way, force 662 is exerted when seal assembly 630 is press fit into housing groove 650, there being some interference between seal assembly 630 and groove 650 (an installer can use a tool to slide seal assembly 630 from right to left). Seal assembly 630 thus can form an interference fit, or friction fit, with housing groove 650 and thus can form a snap-fit with housing groove 650. Optionally, as discussed further below, system pressure can be used to create expansion so that the seal assembly (and, more specifically, a retention element) seats securely within the housing groove.

Figure 7:
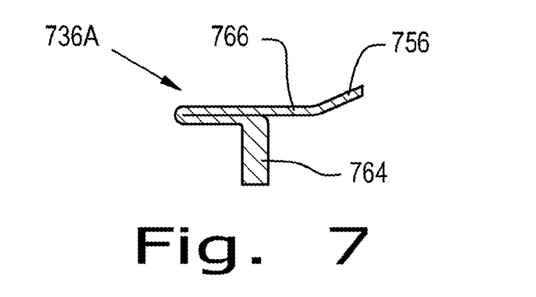
FIG. 7 is a schematic representation of a sectional view of a structural element formed as a can according to another embodiment of the present invention.
Figure 8:
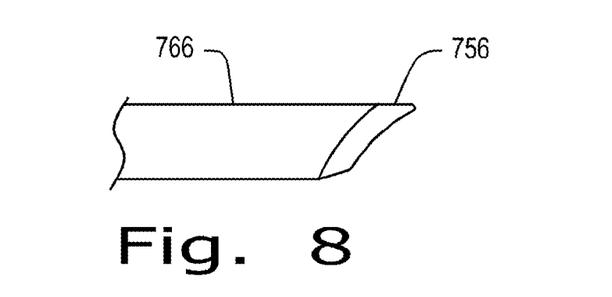
FIG. 8 is a schematic representation of a sectional view of an end of a leg of the can of FIG. 7.
Figure 9:
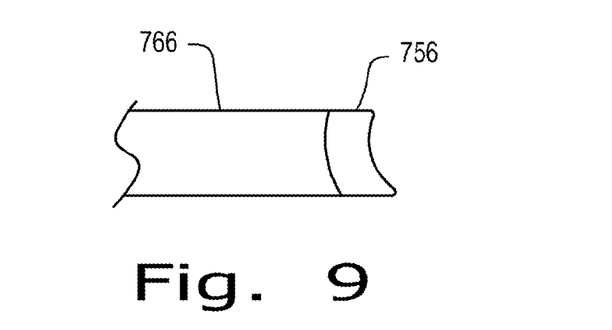
FIG. 9 is a schematic representation of a sectional view of another end of a leg of the can of FIG. 7.
Figure 10:
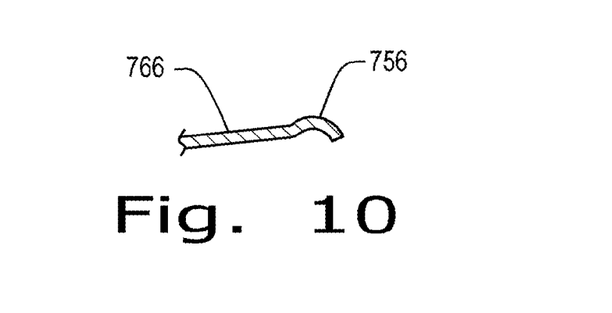
FIG. 10 is a schematic representation of a sectional view of another end of a leg of the can of FIG. 7.

FIG. 7 shows another embodiment of a structural element according to the present invention. Structural features in FIGS. 7-10 corresponding to similar features in prior figures have reference characters raised by a multiple of 100. While the seal element, the wiper element, the housing, and the rod are not shown, it is understood that these components can be provided as in the prior figures. Structural element 736A is formed as a single can to which the seal element and the wiper element are attached. Can 736A includes a downwardly extending, centrally located leg 764 which helps prevent extrusion of the seal element to the downstream side of leg 764. Can 736A further includes a generally horizontal leg 766 which would be adjacent the horizontal surface of the housing groove. On the downstream side of this leg is a pre-formed bend (bent upwardly) which serves as a retention element 756 which is formed integral with can 736A. Retention element 756 mates with a recess formed by the housing groove so as to retain the seal assembly (of which can 736A is a part, as in the prior embodiments of the present invention) in the housing groove. FIGS. 8, 9, and 10 show optional designs of the end of leg 766 forming retention element 756. FIG. 10 shows that the end of this leg can have a raised and rounded projection, which would fit within a recess formed by the housing groove so as to retain the seal assembly in the housing groove.

Figure 11:
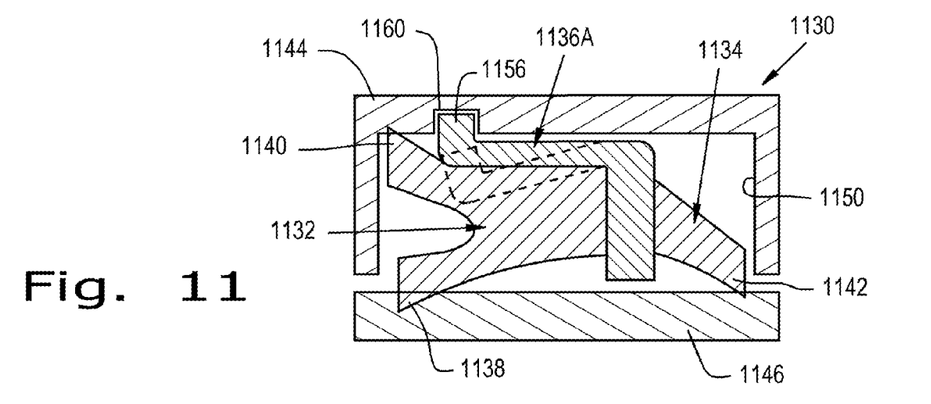
FIG. 11 is a schematic representation of a sectional view of a seal assembly according to another embodiment of the present invention.
Figure 12:
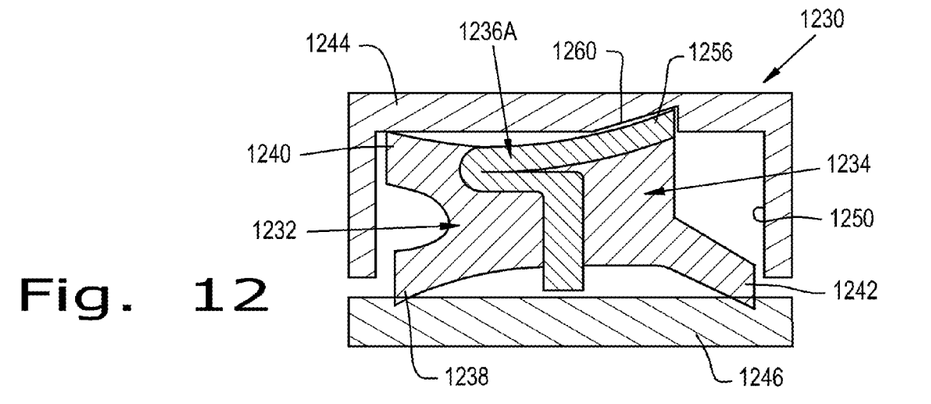
FIG. 12 is a schematic representation of a sectional view of a seal assembly according to another embodiment of the present invention.
Figure 13:
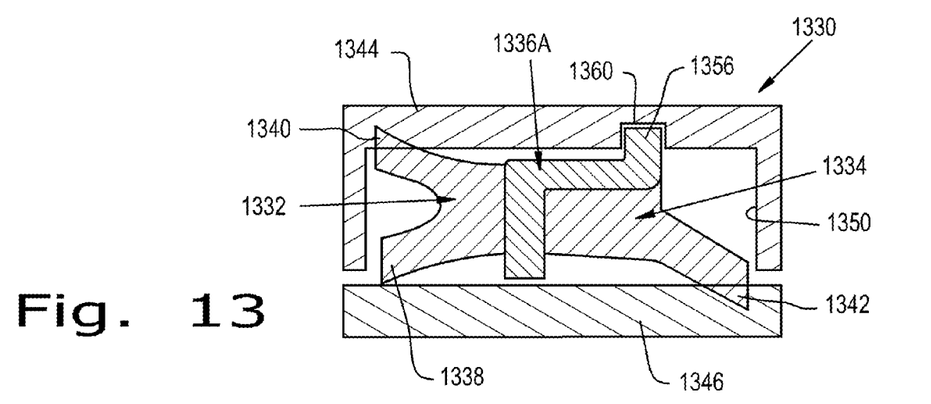
FIG. 13 is a schematic representation of a sectional view of a seal assembly according to another embodiment of the present invention.

FIGS. 11, 12, and 13 show additional embodiments of the seal assembly according to the present invention. Structural features in FIGS. 11, 12, and 13 corresponding to similar features in prior figures each have reference characters raised by a multiple of 100. Seal assembly 1130, 1230, 1330 includes seal element 1132, 1232, 1332, wiper element 1134, 1234, 1334, and structural element 1136A, 1236A, 1336A. Seal assembly 1130, 1230, 1330 is seated in groove 1150, 1250, 1350 of housing 1144, 1244, 1344 and seals on the inner diameter of seal assembly 1130, 1230, 1330 against rod 1146, 1246, 1346. Seal element 1132, 1232, 1332 includes inside diameter seal lip 1138, 1238, 1338 sealing dynamically against rod 1146, 1246, 1346 and outside diameter seal lip 1140, 1240, 1340 sealing statically against a surface of housing groove 1150, 1250, 1350. Wiper element 1134, 1234, 1334 includes a wiper lip 1142, 1242, 1342 which is positioned against rod 1146, 1246, 1346. Structural element 1136A, 1236A, 1336A is formed as a single can to which seal element 1132, 1232, 1332 and wiper element 1134, 1234, 1334 are attached. Can 1136A, 1236A, 1336A includes a downwardly extending, centrally located leg which helps prevent extrusion of seal element 1132, 1232, 1332 to the downstream side of this leg. Can 1136A, 1236A, 1336A of FIG. 12 includes a leg which folds back on itself. Can 1136A, 1236A, 1336A further includes a retention element 1156, 1256, 1356 which can be formed integral with can 1136A, 1236A, 1336A or can be otherwise affixed to can 1136A, 1236A, 1336A, retention element 1156, 1256, 1356 for retaining seal assembly 1130, 1230, 1330 in housing groove 1150, 1250, 1350. Retention element 1156, 1256, 1356 in FIGS. 11-13 is formed integral with structural element 1136A, 1236A, 1336A; stated another way, structural element 1136A, 1236A, 1336A includes retention element 1156, 1256, 1356 in FIGS. 11-13. Retention element 1156, 1256, 1356 fits within a recess 1160, 1260, 1360 formed by housing groove 1150, 1250, 1350. More specifically, retention element 1156, 1256, 1356 forms a male tab which fits within a female recess 1160, 1260, 1360 (the recess 1160, 1260, 1360 of housing groove 1150, 1250, 1350 can otherwise be a step, cavity, slot, or recess formed in a wall of housing groove 1150, 1250, 1350). Retention element 1156, 1256, 1356 provides for "spring back" installation, retention element 1156, 1256, 1356 being compressed radially inwardly and then springing back radially outwardly so as to seat within recess 1160, 1260, 1360 and thereby to retain seal assembly 1130, 1230, 1330 in housing groove 1150, 1250, 1350. Thus, structural element 1136A, 1236A, 1336A is a can, can 1136A, 1236A, 1336A being configured for compressing during installation of seal assembly 1130, 1230, 1330 in housing groove 1150, 1250, 1350 and for springing back when retention element 1156, 1256, 1356 seats in recess 1160, 1260, 1360 of housing groove 1150, 1250, 1350. FIG. 11 shows the horizontal leg of can 1136A also in broken lines to show the deformation experienced by this leg prior to springing back and thereby seating in recess 1160. Retention element 1156, 1256, 1356 and/or another portion of can 1136A, 1236A, 1336A can be fingered or slotted so that can 1136A, 1236A, 1336A can more easily compress prior to seating retention element in recess 1160, 1260, 1360 (the slots can be compressed so as to deform can 1136A, 1236A, 1336A more easily during insertion and prior to spring-back of can 1136A, 1236A, 1336A and retention element 1156, 1256, 1356). The slots are the valleys between the fingers, the slots being cuts around the circumference of can 1136A, 1236A, 1336A (which includes retention element 1156, 1256, 1356), the fingers being the raised portions between the slots (or what is left after the slots are cut out of the can 1136A, 1236A, 1336A). The slots and fingers are not shown in the drawings. Thus, during installation, seal assemblies 1130, 1230, 1330 can be press fit into the housing groove 1150, 1250, 1350. Prior to seating of retention element 1156, 1256, 1356 in recess 1160, 1260, 1360, the generally horizontal leg of can 1136A, 1236A, 1336A is compressed radially inwardly. Seal assembly 1130, 1230, 1330 can be slid within housing groove 1150, 1250, 1350 (left or right) until retention element 1156, 1256, 1356 springs radially outwardly into recess 1160, 1260, 1360.

Figure 14:
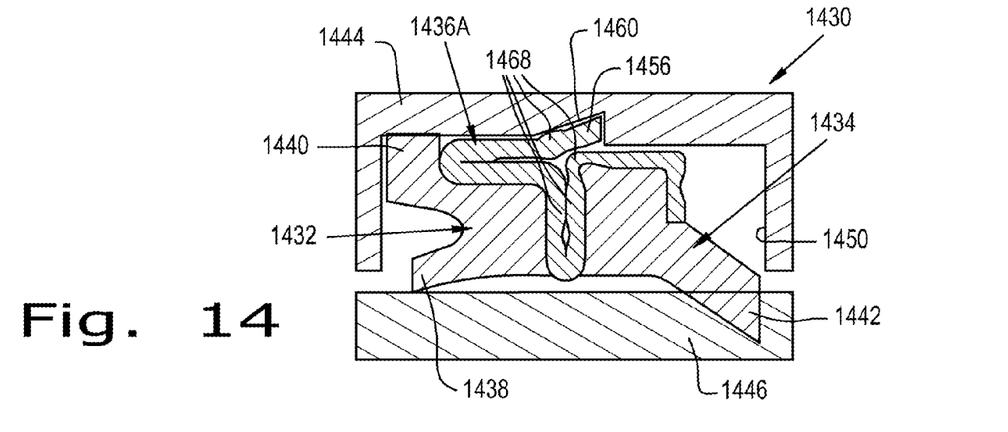
FIG. 14 is a schematic representation of a sectional view of a seal assembly according to another embodiment of the present invention.
Figure 15:
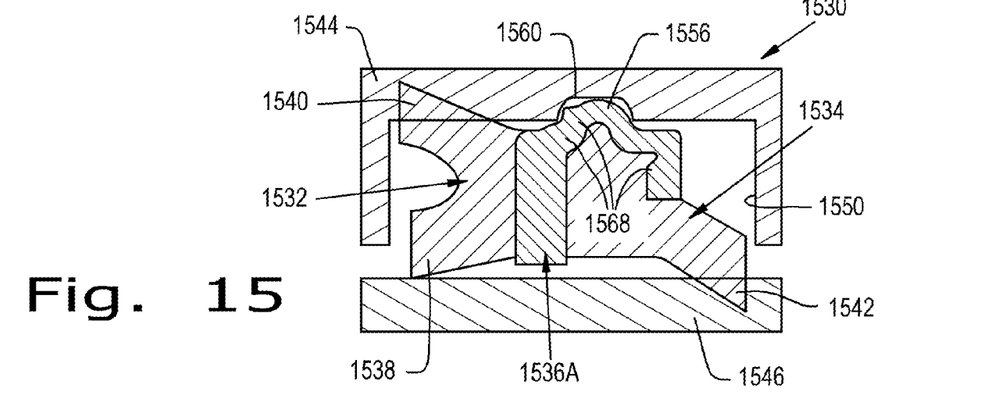
FIG. 15 is a schematic representation of a sectional view of a seal assembly according to another embodiment of the present invention.
Figure 16:
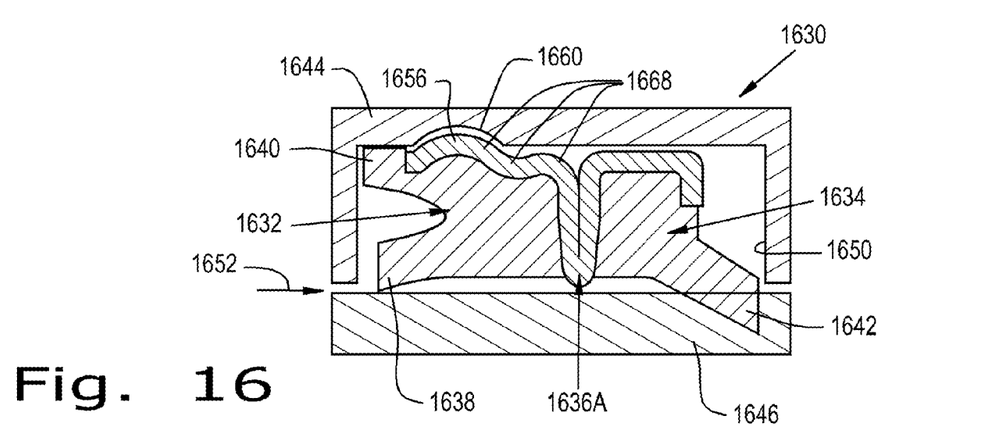
FIG. 16 is a schematic representation of a sectional view of a seal assembly according to another embodiment of the present invention.
Figure 17:
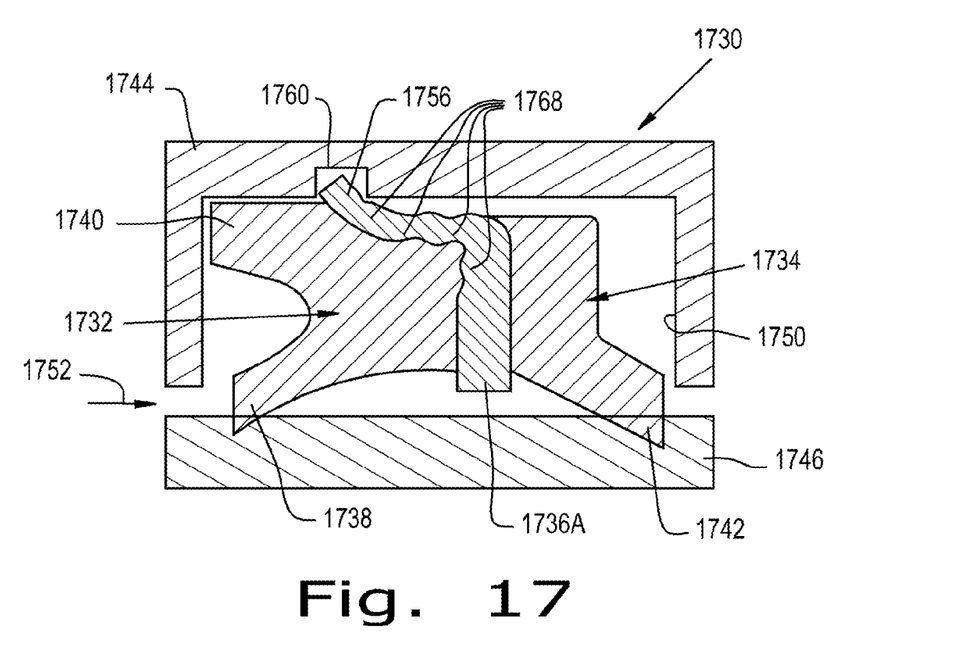
FIG. 17 is a schematic representation of a sectional view of a seal assembly according to another embodiment of the present invention.

FIGS. 14, 15, 16, and 17 show additional embodiments of the seal assembly according to the present invention. Structural features in FIGS. 14, 15, 16, and 17 corresponding to similar features in prior figures each have reference characters raised by a multiple of 100. Seal assembly 1430, 1530, 1630, 1730 includes seal element 1432, 1532, 1632, 1732, wiper element 1434, 1534, 1634, 1734, and structural element 1436A, 1536A, 1636A, 1736A. Seal assembly 1430, 1530, 1630, 1730 is seated in groove 1450, 1550, 1650, 1750 of housing 1444, 1544, 1644, 1744 and seals on the inner diameter of seal assembly 1430, 1530, 1630, 1730 against rod 1446, 1546, 1646, 1746. Seal element 1432, 1532, 1632, 1732 includes inside diameter seal lip 1438, 1538, 1638, 1738 sealing dynamically against rod 1446, 1546, 1646, 1746 and outside diameter seal lip 1440, 1540, 1640, 1740 sealing statically against a surface of housing groove 1450, 1550, 1650, 1750. Wiper element 1434, 1534, 1634, 1734 includes a wiper lip 1442, 1542, 1642, 1742 which is positioned against rod 1446, 1546, 1646, 1746. Structural element 1436A, 1536A, 1636A, 1736A is formed as a single can to which seal element 1432, 1532, 1632, 1732 and wiper element 1434, 1534, 1634, 1734 are attached. Can 1436A, 1536A, 1636A, 1736A includes a downwardly extending, centrally located leg which helps prevent extrusion of seal element 1432, 1532, 1632, 1732 to the downstream side of this leg. Can 1436A, 1536A, 1636A, 1736A further includes a retention element 1456, 1556, 1656, 1756 which can be formed integral with can 1436A, 1536A, 1636A, 1736A or can be otherwise affixed to can 1436A, 1536A, 1636A, 1736A, retention element 1456, 1556, 1656, 1756 for retaining seal assembly 1430, 1530, 1630, 1730 in housing groove 1450, 1550, 1650, 1750. Retention elements 1456, 1556, 1656, 1756 are formed integral with structural element 1436A, 1536A, 1636A, 1736A. Retention element 1456, 1556, 1656, 1756 fits within recess 1460, 1560, 1660, 1760 formed by housing groove 1450, 1550, 1650, 1750. Retention elements 1456, 1556, 1656, 1756, however, are not necessarily formed as protrusions until after bending occurs while in housing groove 1450, 1550, 1650, 1750. Seal assemblies 1430, 1530, 1630, 1730 provide for limited interference in the housing groove 1450, 1550, 1650, 1750 with the installation method during initial insertion of seal assembly 1430, 1530, 1630, 1730 in housing groove 1450, 1550, 1650, 1750. Rather, the secure fit is provided by at least partially crumpling the can 1436A, 1536A, 1636A, 1736A so as to seat retention element 1456, 1556, 1656, 1756 within recess 1460, 1560, 1760, 1860 of housing groove 1450, 1550, 1650, 1750. The can 1436A, 1536A, 1636A, 1736A is bent in crumple zones 1468, 1568, 1668, 1768 of the can 1436A, 1536A, 1636A, 1736A so as thereby to retain the seal assembly 1430, 1530, 1630, 1730 in housing groove 1450, 1550, 1650, 1750. In FIGS. 14 and 15, after initial insertion of seal assembly 1430, 1530 in housing groove 1450, 1550, the installer can do the rest of the bending of the can 1436A, 1536A so as to seat retention element 1456, 1556 in recess 1460, 1560. In FIGS. 16 and 17, after initial insertion of seal assembly 1630, 1730 in housing groove 1650, 1750, system pressure 1652, 1752 (i.e., pressure from system fluid) can do the rest of the bending of the can 1636A, 1736A in such crumple zones 1668, 1768 so as to seat retention element 1656, 1756 in recess 1660, 1760; system pressure 1652, 1752 is shown being applied to the right, but it is understood that system pressure 1652, 1752 could be negative and thus exert a force to the left as well. Upon being bent in such crumple zones 1468, 1568, 1668, 1768, a portion of the can 1436A, 1536A, 1636A, 1736A (the retention element 1456, 1556, 1656, 1756) sets within recess 1460, 1560, 1660, 1760 and thereby retains seal assembly 1430, 1530, 1630, 1730 in housing groove 1450, 1550, 1650, 1750. Upon being bent in one or more crumple zones 1468, 1568, 1668, 1768, the can 1436A, 1536A, 1636A, 1736A takes on a permanent shape. FIG. 14 can be bent in crumple zones 1468 so that the end of can 1436A protrudes upwardly forming a retention element 1456 which seats in recess 1460. Similarly, FIG. 15 can be bent in crumple zones 1568 so that the mid-portion of the horizontal leg of can 1536A protrudes upwardly forming a retention element 1556 which seats in recess 1560. In FIG. 16, can 1636A can be bent in crumple zones 1668 so that the end of can 1636A protrudes upwardly forming a retention element 1656 which seats in recess 1660. In FIG. 17, can 1736A can be bent in crumple zones 1768 so that the end of can 1736A protrudes upwardly forming a retention element 1756 which seats in recess 1760. Accordingly, the structural element of FIGS. 14, 15, 16, and 17 is can 1436A, 1536A, 1636A, 1736A, can 1436A, 1536A, 1636A, 1736A being configured for at least partially crumpling after installation of seal assembly 1430, 1530, 1630, 1730 in housing groove 1450, 1550, 1650, 1750 and thereby for seating retention element 1456, 1556, 1656, 1756 in recess 1460, 1560, 1660, 1760 of housing 1444, 1544, 1644, 1744. Further, structural element is can 1636A, 1736A, can 1636A, 1736A being configured for at least partially crumpling after installation of seal assembly 1630, 1730 in housing groove 1650, 1750 and thereby for seating retention element 1656, 1756 in recess 1660, 1760 of housing 1644, 1744 under system pressure 1652, 1752.

Figure 18:
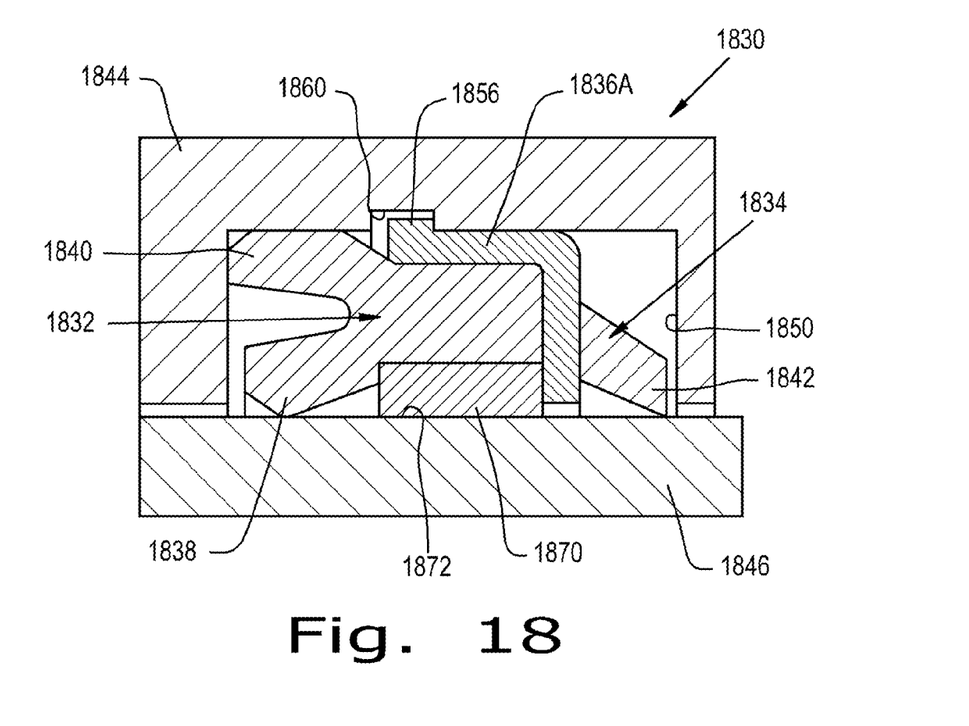
FIG. 18 is a schematic representation of a sectional view of a seal assembly according to another embodiment of the present invention.

FIG. 18 shows another embodiment of the seal assembly according to the present invention. Structural features in FIG. 18 corresponding to similar features in prior figures each have reference characters raised by a multiple of 100. Seal assembly 1830 includes seal element 1832, wiper element 1834, and structural element 1836A. Seal assembly 1830 is seated in groove 1850 of housing 1844 and seals on the inner diameter of seal assembly 1830 against rod 1846. Seal element 1832 includes inside diameter seal lip 1838 sealing dynamically against rod 1846 and outside diameter seal lip 1840 sealing statically against a surface of housing groove 1850. Wiper element 1834 includes a wiper lip 1842 which is positioned against rod 1846. Structural element 1836A is formed as a single can to which seal element 1832 and wiper element 1834 are attached. Can 1836A includes a downwardly extending, centrally located leg which helps prevent extrusion of seal element 1832 to the downstream side of this leg.

Can 1836A further includes a retention element 1856 which can be formed integral with can 1836A or can be otherwise affixed to can 1836A, retention element 1856 for retaining seal assembly 1830 in housing groove 1850. Retention element 1856 in FIG. 18 is formed integral with structural element 1836A. Retention element 1856 (formed as an upstanding tab 1856) fits within recess 1860 formed by housing groove 1850. Seal assembly 1830 further includes a bearing 1870 including a bearing surface 1872 which bears against rod 1846 reciprocating back and forth (left and right in the page of FIG. 18). FIG. 18 shows that bearing 1870 can be bonded (i.e., mechanically or chemically; bearing 1870 can be injection molded, for instance, with the remainder of seal assembly 1830) with seal element 1832 and/or can 1836A. Bearing element 1870 can thus be coupled with at least one of seal element 1832 and can 1836A, bearing element 1870 including a bearing surface 1872 configured for bearing against an element 1846 in motion relative to the seal assembly 1830. Bearing 1870 can be made of metal or a polymer.

Figure 19:
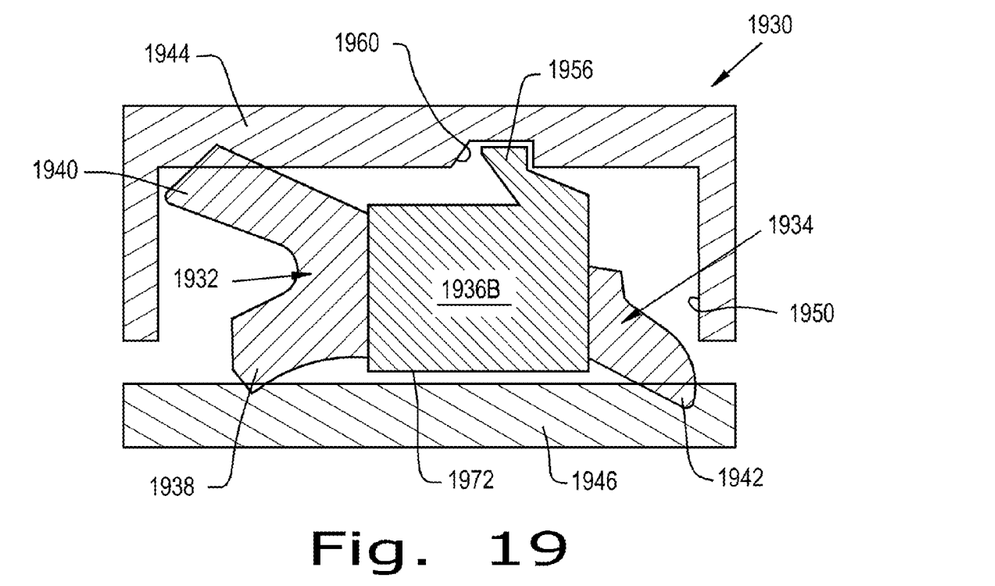
FIG. 19 is a schematic representation of a sectional view of a seal assembly according to another embodiment of the present invention.

FIG. 19 shows another embodiment of the seal assembly according to the present invention. Structural features in FIG. 19 corresponding to similar features in prior figures each have reference characters raised by a multiple of 100. Seal assembly 1930 includes seal element 1932, wiper element 1934, and structural element 1936B. Seal assembly 1930 is seated in groove 1950 of housing 1944 and seals on the inner diameter of seal assembly 1930 against rod 1946. Seal element 1932 includes inside diameter seal lip 1938 sealing dynamically against rod 1946 and outside diameter seal lip 1940 sealing statically against a surface of housing groove 1950. Wiper element 1934 includes a wiper lip 1942 which is positioned against rod 1946. Structural element 1936B is formed as a central structural element to which seal element 1932 and wiper element 1934 are attached. Central structural element 1936B has a downward extent which helps prevent extrusion of seal element 1932 to the downstream side of central structural element 1936B. Central structural element 1936B further combines therewith a retention element 1956 and a bearing surface 1972. More specifically, FIG. 19 shows that central structural element 1936B forms both retention element 1956 and bearing 1972; stated another way, the central structural element 1936B, retention element 1956, and bearing surface 1972 are all formed by a single piece 1936B. Retention element 1956 (formed as an upstanding tab 1956) retains seal assembly 1930 in housing groove 1950. Retention element 1956 seats within recess 1960. Bearing surface 1972 bears against rod 1946. Accordingly, central structural element 1936B includes retention element 1936B and bearing surface 1972, retention element 1956 being configured for retaining the seal assembly 1930 in housing groove 1950, bearing surface 1972 configured for bearing against an element 1946 (i.e., the rod 1946) in motion relative to seal assembly 1930.

Figure 20:
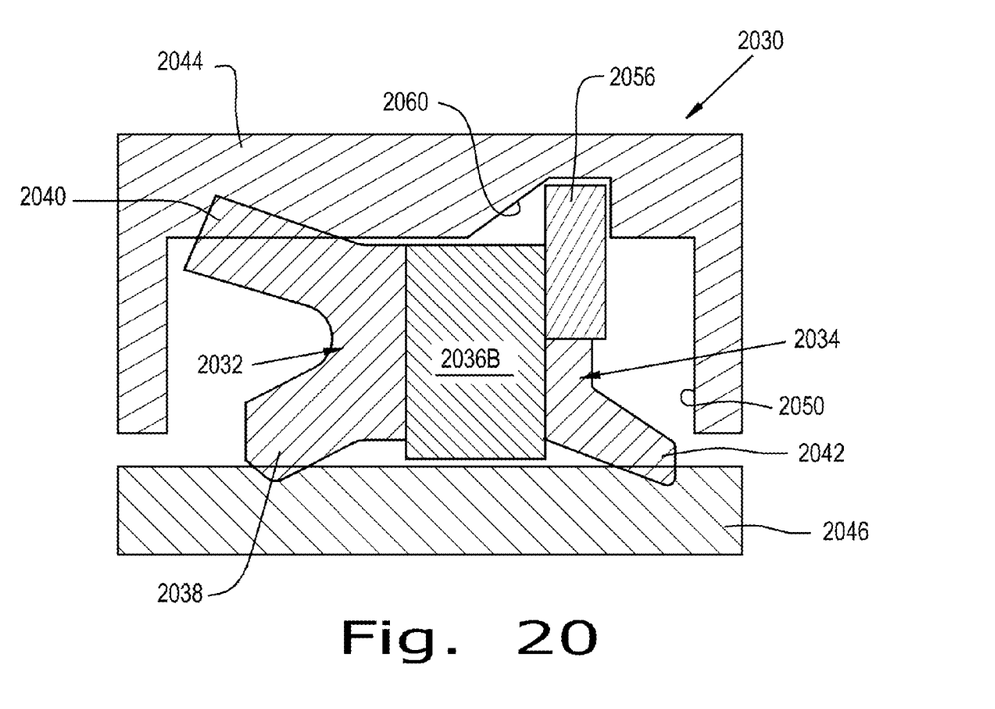
FIG. 20 is a schematic representation of a sectional view of a seal assembly according to another embodiment of the present invention, the seal assembly shown prior to application of system pressure.

FIGS. 20 and 21 show another embodiment of the seal assembly according to the present invention. Structural features in FIGS. 20 and 21 corresponding to similar features in prior figures have reference characters raised by a multiple of 100. FIG. 20 shows seal assembly 2030 prior to the application of system pressure 2052, while FIG. 21 shows seal assembly 2030 after the application of system pressure 2052. Seal assembly 2030 includes seal element 2032, wiper element 2034, and structural element 2036B. Seal assembly 2030 is seated in groove 2050 of housing 2044 and seals on the inner diameter of seal assembly 2030 against rod 2046. Seal element 2032 includes inside diameter seal lip 2038 sealing dynamically against rod 2046 and outside diameter seal lip 2040 sealing statically against a surface of housing groove 2050. Wiper element 2034 includes a wiper lip 2042 which is positioned against rod 2046. Structural element 2036B is formed as a central structural element to which seal element 2032 and wiper element 2034 are attached. Central structural element 2036B has a downward extent which helps prevent extrusion of seal element 2032 to the downstream side of central structural element 2036B. Seal assembly 2030 further includes a retention element 2056 which seats in recess 2060 of housing groove 2050 to retain seal assembly 2030 in housing groove 2050. Retention element 2056 can be formed integral with central structural element 2036B or be formed as a separate element (i.e., a snap-ring) that can be attached or bonded (i.e., using a friction fit, chemical bonding, adhering) to central structural element 2036B and/or wiper element 2034 (and thereby unitizing the seal assembly 2030 with the snap-ring 2056). Thus, the retention element 2056 and the central structural element 2036B can be formed as a single piece or be bonded together and thereby be unitized. Seal element 2032 can be bonded to central structural element 2036B, and wiper element 2034 can be bonded to central structural element 2036B and/or retention element 2056. Upon application of system pressure 2052 (shown by arrow 2052), seal assembly 2030 rotates a predetermined amount in a general counter-clockwise direction, as shown in FIG. 21. Below inner diameter seal lip 2038 is shown in broken lines a contact stress profile, the distance of the broken line from seal lip 2038 corresponding to stress (thus, a greater distance corresponds to higher stress). The bonded area 2074 (between seal element and central structural element) is used to allow for a good contact profile for sealing between seal lip 2038 and rod 2046. The rotation of seal assembly 2030— more specifically, the central structural element 2036B—is used to close the seal element extrusion gap 2076 below central structural element 2036B. Wiper lip 2042 provides good wiping of rod 2046 and good fluid film control. In combination with bonding, the design of the seal assembly 2030 of FIGS. 20 and 21 has been optimized to take advantage of the bonding to construct the seal profile near the central structural element 2036B to take advantage of the increased resistance to extrusion to create an optimized profile that takes advantage of the rotation or deformation of the central structural element 2036B so as to seal better. Further, the wiper design of FIGS. 20 and 21 accommodates the deformation or the rotation of the structural element 2036B and the potential for more rod 2046 deflection. Mindful of space constraints, the design of the seal assembly 2030 of FIGS. 20 and 21 provides the right amount of limited deformation to allow both seal 2032 and wiper 2034 to function. Accordingly, central structural element 2036B is configured for rotating under system pressure 2052 and thereby for substantially closing an extrusion gap 2076.

Thus, the seal assembly of the present invention, which can be used up to 3,000 psi, provides a unitized seal assembly (i.e., one metal can with seal element fitted inside or outside of another metal can with a wiper element; or, a separate retention element (i.e., a snap-ring) provided to secure the seal assembly within the housing groove) or a seal assembly which is a single piece (i.e., the component parts being molded together). The unitized seal assembly can include an assembly of the seal element, the wiper element, and a structural element joining the seal and wiper together but does not include its own retention element for retaining the seal assembly in the housing groove; the retention element can be provided to the seal assembly in the form of a snap-ring or a notch, for example. Whether the seal assembly is unitized or a single piece, the seal assembly provides a static seal, a dynamic seal, a wiper lip, and rigid support (using the structural element of the present invention) for the seal to prevent extrusion and distortion of the seal lip, among other things. Further, a press fit, a snap-ring, or other retention way or device can be provided (in addition to or as a part of the seal assembly) to easily install the seal assembly in a housing groove and to secure the position of the seal assembly after installing the seal assembly in the groove. The seal element and wiper element of the seal assembly can be made of almost anything that provides good sealing and wiping (i.e., thermoset elastomer, thermoplastic elastomer, polyurethane, polytetrafluoroethylene, engineering polymers, etc.). The wiper lip of the wiper and the sealing lips of the seal, in at least one embodiment of the present invention, can be made of different materials.

The retention element of the present invention serves to retain the connection between the seal assembly and the housing groove. The retention element or way which is used can be a press fit (an interference fit between the seal assembly and the housing groove with or without using an additional retention element), mating threaded parts, snap-in features, twist-and-lock features, cold welding, and other mechanical ways that allow for removal and replacement without significant rework of the hardware (i.e., the housing) in which the combination wiper element and seal element (or, as discussed above, the combination seal/wiper/bearing)—the seal assembly—sits. For instance, a mechanical connection can involve a male part on the seal assembly and a female part on the groove, the male and female parts mating together by snapping together.

The bonding and the geometry of the seal assembly according to the present invention, at least in part, enables the seal assembly to withstand pressure up to 3,000 psi and thus to prevent extrusion of the seal and/or the wiper (i.e., to the downstream side of the housing groove). More specifically, bonding using chemical and/or mechanical ways (i.e., dovetail grooves, notches, slots, holes, etc.) can be provided to ensure that the seal in particular, and both the seal and the wiper as well, do not shear, peel, or otherwise detach from the structural element of the seal assembly (i.e., a metal can or can assembly, or the central structural element, as discussed above). For instance, grooves can be created on the two faces of the central structural element to enhance adhesion between the central structural element and polyurethane of the seal element.

In use, a seal installer receives the seal assembly of the present invention, the seal assembly including at a minimum a seal element and a wiper element which are connected to a rigid structural element. The structural element can be a can (a single can or a can assembly including a plurality of cans) or a central structural element, as discussed above. The seal assembly can further include a retention element provided separate from the seal assembly or provided integral with the structural element. If the retention element is provided separate from the seal assembly, the retention element can be added to the seal assembly (i.e., so as to abut the structural element) during installation so that the seal assembly remains in the housing groove during application of system pressure. The seal assembly can further include a bearing element or bearing surface to bear against the reciprocating rod. The installer inserts the seal assembly in the housing groove. The seal assembly can be such that a press-fit is formed with the housing groove. Alternatively, the seal assembly can be such that little, if any, interference occurs between the seal assembly and the housing groove. The structural element (i.e., the can version) can be provided with a spring-back feature such that at least part of the structural element (i.e., a leg of a can, or the retention element) is compressed after loading the seal assembly in the housing groove. The installer can move the seal assembly left or right in the housing groove to seat the retention feature in a recess of the housing groove. When the retention element seats within the recess of the housing groove, the compressed element springs back into proper shape. Alternatively, the structural element (i.e., the can version) can be provided with crumple zones which crumple upon application of pressure (whether applied by the installer or system pressure) so that a retention element is formed or otherwise seats within the recess of the housing groove. Upon application of system pressure, a dynamic and a static seal are formed by the inner diameter seal lip and the outer diameter seal lip, respectively, of the seal element. In addition to providing a degree of sealing, the wiper element serves to regulate the thickness of the fluid film on the rod (i.e., the fluid to a small degree can flow under the seal to keep the seal element from becoming prematurely damaged by friction on the rod). Further, the wiper element serves to keep contaminants from entering from the downstream side of the seal assembly, as such contaminants could damage the seal element and/or otherwise cause problems to the interior of the system. The wiper element thus serves to keep things in and to keep things out.

Further, the housing groove in which the seal assembly of the present invention fits can be open and the seal assembly can optionally be fit with interference, and a stopper ring (not shown) can be included to avoid any risk that system pressure pushes the seal assembly out of the housing groove. Further, the housing groove can have a wider or narrower extent (wider between the vertical walls of the housing groove), relative to the seal assembly of the present invention, than that shown in the drawings.

The seal assembly of the present invention can be used in a number of high-pressure (i.e., up to 3,000 psi) applications. Such applications include, but are not necessarily limited to, machine tools (i.e., injection molding), construction equipment (i.e., hydraulics in backhoes and excavators), aerospace (i.e., landing gear and flight controls), and the oil and gas industry. These examples are provided by way of example and not be way of limitation.

The present invention further provides a method of sealing using a seal assembly 130, the method including the steps of: providing seal assembly 130 which includes a seal element 132 including at least one seal lip 138, 140, a wiper element 134 including a wiper lip 142, and a structural element 136A attached to seal element 132 and wiper element 134; installing seal assembly 130 in a housing groove 150; applying pressure 152 to seal assembly 130 in an amount greater than 500 pounds per square inch, seal assembly 130 functioning under pressure 152. The structural element of the present invention is at least one can 136A or a central structural element 436B. The amount of pressure 152 is up to 3,000 psi. The method can further include preventing extrusion of seal element 136 through a housing gap 154 using structural element 136A, at least one seal lip 138 being an inner diameter seal lip 138 which is dynamic, seal element 132 further including an outside diameter seal lip 140 which is static. The method can further include providing a retention element 556, 656 coupled with structural element 536B, 636A and retaining seal assembly 530, 630 in housing groove 550, 650 using retention element 556, 656. Structural element 636A includes retention element 656. The structural element of the present invention can be can 1136A, 1236A, 1336A, the method further including compressing can 1136A, 1236A, 1336A during installation of seal assembly 1130, 1230, 1330 in housing groove 1150, 1250, 1350 and springing back can 1136A, 1236A, 1336A when retention element 1156, 1256, 1356 seats in recess 1160, 1260, 1360 of housing groove 1150, 1250, 1350. The structural element of the present invention can be can 1436A, 1536A, 1636A, 1736A, the method further including at least partially crumpling can 1436A, 1536A, 1636A, 1736A after installation of seal assembly 1430, 1530, 1630, 1730 in housing groove 1450, 1550, 1650, 1750 and thereby seating retention element 1456, 1556, 1656, 1756 in recess 1460, 1560, 1660, 1760 of housing 1444, 1544, 1644, 1744. The structural element of the present invention can be can 1636A, 1736A, the method further including using system pressure 1652, 1752 to at least partially crumple can 1636A, 1736A after installation of seal assembly 1630, 1730 in housing groove 1650, 1750 and thereby seating retention element 1656, 1756 in recess 1660, 1760 of housing 1644, 1744. The method can further include providing bearing element 1870 which is coupled with seal element 1832 and/or can 1836A, bearing element 1870 including bearing surface 1872, the method further including bearing bearing surface 1872 against an element 1846 in motion relative to seal assembly 1830. Central structural element 1936B can include retention element 1936B and bearing surface 1972, the method further including retaining seal assembly 1930, using retention element 1956, in housing groove 1950, and bearing bearing surface 1972 against an element 1946 in motion relative to seal assembly 1930. The method can further include rotating central structural element 2036B under system pressure 2052 and thereby substantially closing extrusion gap 2076.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of sealing using a seal assembly, said method comprising the steps of:

providing the seal assembly which includes a seal element including at least one seal lip, a wiper element including a wiper lip, and a structural element attached to said seal element and said wiper element, said structural element being made of a material which is different from a material of said seal element and a material of said wiper element, said structural element including a downstream side and an inner diameter surface and an outer diameter surface which said downstream side does not include, said wiper element being bonded to only said downstream side of said structural element, said wiper element not being attached to said inner diameter surface and said outer diameter surface of said structural element, said downstream side of said structural element including a downstream-most surface to which said wiper element is bonded, said downstream-most surface being a radial surface, said structural element including an upstream-most radial surface which opposes said downstream-most radial surface, said seal element being bonded to said upstream-most radial surface, said inner diameter surface and said downstream-most surface respectively each being straight in a radial cross-section through said structural element;

installing the seal assembly in a housing groove; and applying pressure to the seal assembly in an amount greater than 500 pounds per square inch, the seal assembly functioning under said pressure.

2. The method of claim 1, wherein said structural element is one of at least one can and a central structural element, said structural element including an inside diameter which extends radially inwardly relative to said seal element, said amount of pressure being up to 3,000 pounds per square inch.

3. The method of claim 2, further including preventing extrusion of said seal element through a housing gap using said structural element, said at least one seal lip being an inner diameter seal lip which is dynamic, said seal element further including an outside diameter seal lip which is static.

4. The method of claim 2, further including rotating said central structural element under system pressure and thereby substantially closing an extrusion gap.

* * * * *